(12) United States Patent
Yang et al.

(10) Patent No.: US 11,746,026 B1
(45) Date of Patent: Sep. 5, 2023

(54) PREPARATION AND APPLICATION OF GRADIENT LONG-EFFECTIVE CATALYTIC MEMBRANE WITH HIGH-STRENGTH AND ANTI-DEPOSITION PROPERTY

(71) Applicant: Beijing Normal University, Zhuhai, Zhuhai (CN)

(72) Inventors: Yi Yang, Zhuhai (CN); Lulu Bao, Shenzhen (CN); Huiqi Zhu, Guangzhou (CN); Xuhui Xu, Zhuhai (CN); Yinuo Wang, Puyang (CN); Yuxi Long, Ji'an (CN); Ruikun Xu, Hefei (CN); Haowen Lin, Shenzhen (CN); Chenyang Zheng, Shenzhen (CN)

(73) Assignee: BEIJING NORMAL UNIVERSITY, ZHUHAI, Zhuhai (CN)

( * ) Notice: Subject to any disclaimer, the term of this patent is extended or adjusted under 35 U.S.C. 154(b) by 0 days.

(21) Appl. No.: 18/117,445

(22) Filed: Mar. 5, 2023

(30) Foreign Application Priority Data

Mar. 11, 2022 (CN) .......................... 202210237377.3

(51) Int. Cl.
*C02F 1/44* (2023.01)
*B01J 37/32* (2006.01)
(Continued)

(52) U.S. Cl.
CPC ............ *C02F 1/44* (2013.01); *B01D 69/1213* (2022.08); *B01D 71/281* (2022.08);
(Continued)

(58) Field of Classification Search
None
See application file for complete search history.

(56) References Cited

FOREIGN PATENT DOCUMENTS

| CN | 106430309 A | 2/2017 |
|----|-------------|--------|
| CN | 106868714 A | 6/2017 |
| CN | 107469827 A | 12/2017 |

OTHER PUBLICATIONS

Denis O'Carroll et al.,Nanoscale zero valent iron and bimetallic particles for contaminated site remediation, Advances in Water Resources, Jan. 2013, 104-122, vol. 51.
(Continued)

*Primary Examiner* — Krishnan S Menon
(74) *Attorney, Agent, or Firm* — Zhigang Ma (57) ABSTRACT

A preparation method of a gradient long-effective catalytic membrane with high-strength and anti-deposition property is provided and includes: adding a nanometal oxide catalyst into an N, N-dimethylformamide solution of polyacrylonitrile or polystyrene, uniformly mixing, performing electrostatic spinning, keeping a receiver at −190° C. to −200° C. in the electrostatic spinning process, and performing freeze drying on a precursor membrane obtained after the electrostatic spinning is finished, so as to obtain the gradient long-effective catalytic membrane. According to the method, the gradient long-effective catalytic membrane with high-strength and anti-deposition property is obtained through a one-step method which adopts an ultralow-temperature-electrostatic spinning technology and combines with nanometal, the contradictory relation between the catalytic efficiency and the membrane stability in a traditional catalytic membrane is solved, the catalytic performance of the membrane is fully played, the organic polluted wastewater can be efficiently catalytically degraded, and the service life of the catalytic membrane is prolonged.

4 Claims, 4 Drawing Sheets

(51) Int. Cl.
  *B01J 37/08* (2006.01)
  *B01D 71/28* (2006.01)
  *B01D 69/12* (2006.01)
  *B01J 23/745* (2006.01)
  *B01D 71/42* (2006.01)
  *C02F 101/30* (2006.01)
(52) U.S. Cl.
  CPC .......... *B01D 71/421* (2022.08); *B01J 23/745* (2013.01); *B01J 37/08* (2013.01); *B01J 37/32* (2013.01); *C02F 2101/30* (2013.01)

(56) References Cited

OTHER PUBLICATIONS

Zhanqiang Fang et al., Debromination of polybrominated diphenyl ethers by Ni/Fe bimetallic nanoparticles: Influencing factors, kinetics, and mechanism, Journal of Hazardous Materials, Jan. 2011, 958-969, vol. 185, issues 2-3.
Xinhong Qiu et al.,Degradation of decabromodiphenyl ether by nano zero-valent iron immobilized in mesoporous silica microspheres,Journal of Hazardous Materials, 2011, 70-81, vol. 193.
Jintao Lian et al.,Fenton-like catalytic degradation of tetracycline by magnetic palygorskite nanoparticles prepared from steel pickling waste liquor, 2019, 105273, vol. 182.
Ruixiong Huang et al.,Ultrasonic Fenton-like catalytic degradation of bisphenol A by ferroferric oxide (Fe3O4) nanoparticles prepared from steel pickling waste liquor, Journal of Colloid & Interface Science, 2014, 258-266, vol. 436.
Amnorzahira Amir et al., Enhanced reductive dechlorination of tetrachloroethene by nano-sized zero valent iron with vitamin B12, Chemical Engineering Journal, 2011, 492-497, vol. 170, issues 2-3.
Pijit Jiemvarangkul et al., Enhanced transport of polyelectrolyte stabilized nanoscale zero-valent iron (nZVI) in porous media, Chemical Engineering Journal, 2011, 482-491, vol. 170, issues 2-3.
Anna Ryu et al., Reduction of highly concentrated nitrate using nanoscale zero-valent iron: Effects of aggregation and catalyst on reactivity, Applied Catalysis B: Environmental, 2011, 128-135, vol. 105, issues 1-2.
Jialu Shi et al., Selective reduction of nitrate into nitrogen using Fe—Pd bimetallic nanoparticle supported on chelating resin at near-neutral pH, Chemical Engineering Journal, 2016, 128-125, vol. 286.
Xiang Cai et al., Removal of co-contaminants Cu (II) and nitrate from aqueous solution using kaolin-Fe/Ni nanoparticles, Chemical Engineering Journal, 2014, 19-26, vol. 244.
Jialu Shi et al., Preparation of nanoscale zero-valent iron supported on chelating resin with nitrogen donor atoms for simultaneous reduction of Pb2+ and NO3-, Chemical Engineering Journal, 2013, 166-171, vol. 230.
Yun Zhang et al., Enhanced removal of nitrate by a novel composite: Nanoscale zero valent iron supported on pillared clay, Chemical Engineering Journal, 2011, 526-531, vol. 171.
Jiawei Ren et al., "Robbing behavior" and re-immobilization of nanoscale zero-valent iron (nZVI) onto electrospun polymeric nanofiber mats for trichloroethylene (TCE) remediation, Separation and Purification Technology, 2017, 375-381, vol. 189.
Wendong Zhu et al., Transition metal sulfides meet electrospinning: versatile synthesis, distinct properties and prospective applications, Nanoscale, 2021, 13, 9112-9146.
Honglin Qu et al., Coaxial electrospun nanostructures and their applicationsJournal of Materials Chemistry A, 2013, 11513-11528.
Pei-Pei Lu et al., Processing-Structure-Property Correlations of Polyethersulfone/Perfluorosulfonic Acid Nanofibers Fabricated via Electrospinning from Polymer-Nanoparticle Suspensions, ACS Applied Materials & Interfaces, 2012, 1716-1723.
Zenghui Mai et al., Catalytic nanofiber composite membrane by combining electrospinning precursor seeding and flowing synthesis for immobilizing ZIF-8 derived Ag nanoparticles, Journal of Membrane Science, 2022, 120045.
Zhigao Zhu et al., Adsorption-intensified degradation of organic pollutants over bifunctional α-Fe@carbon nanofibres, Environmental Science: Nano, 2017, 302-306.
Sangmo Kang et al., Fabrication of hollow activated carbon nanofibers (HACNFs) containing manganese oxide catalyst for toluene removal via two-step process of electrospinning and thermal treatment, Chemical Engineering Journal, 2020, 122315.
Jesse T. McCann et al., Highly Porous Fibers by Electrospinning into a Cryogenic Liquid, J. Am. Chem. Soc. 2006, 128, 1436-1437.
CNIPA, Notification of a First Office Action for CN202210237377. 3, dated Jul. 11, 2022.
Zhuhai Campus of Beijing Normal University (Applicant), Reply to Notification of a First Office Action for CN202210237377.3, w/ replacement claims, Jul. 22, 2022.
Zhuhai Campus of Beijing Normal University (Applicant), Supplemental Reply to Notification of a First Office Action for CN202210237377.3, w/ (allowed)replacement claims, Aug. 5, 2022.
CNIPA, Notification to grant patent right for invention in CN202210237377.3, dated Sep. 13, 2022.
Jesse T. McCann et al, Highly Porous Fibers by Electrospinning into a Cryogenic Liquid, Journal of the American Chemical Society, Jan. 13, 2006, p. 1436.

PREPARATION AND APPLICATION OF GRADIENT LONG-EFFECTIVE CATALYTIC MEMBRANE WITH HIGH-STRENGTH AND ANTI-DEPOSITION PROPERTY

TECHNICAL FIELD

The disclosure relates to the technical field of composite materials, particularly to a method for preparing a gradient long-effective catalytic membrane with high-strength and anti-deposition property, a product of the gradient long-effective catalytic membrane with high-strength and anti-deposition property, and an application of the gradient long-effective catalytic membrane with high-strength and anti-deposition property.

BACKGROUND

A good ecological environment is a fundamental basis for sustainable development of people and society. With the vigorous development of modern industry and continuous improvement of environmental awareness of people, the environmental pollution problem has attracted increasing attention. The organic wastewater is one of important sources of environmental pollution, and the effective treatment and the environmental remediation after pollution have become research topics of many scholars. Based on the above background, how to realize efficient green purification of organic wastewater and improve economic benefits of polluted water remediation is of great practical significance for realizing sustainable development. Wet oxidation is an important method to treat organic wastewater in industry because of its mild conditions and wide operation range. However, due to the catalytic performance of the catalyst, it is difficult for the wet oxidation to give full play to its potential in treating organic wastewater. Along with the continuous development of modern technology, nanotechnology has been widely used in degradation of water pollutants and in-situ environmental remediation (Please refer to Denis O'Carroll et al., Advances in Water Resources, 2013, 51, 104-122). In recent years, with the continuous development of the organic industry, people begin to focus the study on the application of nanometal oxides to treat organic wastewater such as polybrominated diphenyl ethers (abbreviated as PBDEs) (Please refer to Zhanqiang Fang et al., Journal of Hazardous Materials, 2011JAN, 185 (2-3), 958-969; and Xinhong Qiu et al., Journal of Hazardous Materials, 2011, 193, 70-81), antibiotics (Please refer to Jintao Lian et al., Applied Clay Science, 2019, 182, 105273), bisphenol A (abbreviated as BPA) (Please refer to Ruixiong Huang et al., Journal of Colloid & Interface Science, 2014, 436, 258-266) and so on, which cannot be effectively treated by traditional treatment methods. Although the nanometal oxide has many advantages, the defects thereof are also prominent. Characteristics of high cost, rapid deactivation and easy agglomeration of particles limit their application in industry (Please refer to Amnorzahira Amir et al., Chemical Engineering Journal, 2011, 170 (2-3), 492-497; and Pijit Jiemvarangkul et al., Chemical Engineering Journal, 2011, 170 (2-3), 482-491). Researchers attempt to improve the stability and dispersibility of the nanometal oxide by using different modification methods, including using a two-component system, introducing a carrier, adding a surfactant, and the like. The introduction of the carrier to prepare the nanoparticle composite carrier catalyst is proved to be able to effectively improve the performance of the catalyst. Suitable carriers may enable the nanometal oxide to achieve a better catalytic effect, the suitable carriers include metals and oxides thereof such as cuprum (abbreviated as Cu), nickel (abbreviated as Ni), lead or plumbum (abbreviated as Pb) (Please refer to Anna Ryu et al., Applied Catalysis B: Environmental, 2011, 105 (1-2), 128-135; and Jialu Shi et al., Chemical Engineering Journal, 2016, 286, 408-415), as well as other compounds (Please refer to Xiang Cai et al., Chemical Engineering Journal, 2014, 244, 19-26; Jialu Shi et al., Chemical Engineering Journal, 2013, 230, 166-171; and Yun Zhang et al., Chemical Engineering Journal, 2011, 171, 526-531) such as clay, molecular sieve, and resin. However, according to the current research results, the catalysts prepared by these methods have high cost and poor effect.

At present, there are two main methods to prepare nanoparticle carrier composite catalyst. The one method is to load the nanometal on the surface of the fiber by ion exchange, impregnation, liquid-phase reduction, etc. (Please refer to Jiawei Ren et al., Separation and Purification Technology, 2017, 189, 375-381; and Wendong Zhu et al., Nanoscale, 2021, 20, 13, 9112-9146). The catalytic membrane prepared by the method has large exposed area of active components, high contact efficiency between catalyst and reactants, and excellent initial catalytic activity, but the active components are easy to agglomerate, the interaction force is weak, and the nanometal is easy to lose during use, and the stability of the catalyst is poor. The other method is to coat the nanometal in the polymer fiber at the preparation stage of the fibers (Please refer to Honglin Qu et al., Journal of Materials Chemistry A, 2013, 38, 1, 11513-11528). In the catalytic membrane prepared by the method, the nanometal is entrapped in the polymer fiber, which protect the nanoparticles from surface corrosion and significantly increase the stability of the catalytic membrane. However, since the surface of the polymer fiber is uniform and continuous, the reaction mass between the reactant and the entrapped nanometal is affected, resulting in lower catalytic reaction efficiency.

Therefore, how to enable the catalytic membrane to have excellent catalytic activity and stability simultaneously becomes a problem to be solved. Researchers take into account the preparation of fiber materials with porous structures, and coating the nanometal in the fiber to achieve the purpose of enhancing mass transfer. Porous structure can be formed on the polymer fiber by adding the pore-forming agent, but the addition of the pore-forming agent affects the structure of the polymer and the dispersion of the nanometal, weakens the interaction between the polymer and the nanometal, and the structure, size and pore distribution are difficult to control (Please refer to Pei-Pei Lu et al., ACS Applied Materials & Interfaces, 2012, 3, 4, 1716-1723). Another common method is surface modification, and a porous structure is formed on the surface of the polymer fiber by methods such as corrosion, oxidation and the like (Please refer to Zenghui Mai et al., Journal of Membrane Science, 2022, 643, 120045). However, after surface treatment, the groups in the polymer fiber structure will change, and even the nanometal in the fiber become passivated, so that the stability and the catalytic efficiency of the catalytic membrane are reduced. In addition, researchers also attempt to turn polymer fibers into porous carbon fibers by calcination (Please refer to Zhigao Zhu et al., Environmental Science: Nano, 2017, 302-306), but the good stability and ductility of the polymer and the interaction force with the nanometal cannot be retained, which not only reduces the stability of the catalytic membrane, but also seriously affects the mechanical strength of the catalytic membrane. At the same time, the pore size of the carbon fiber obtained after the calcination is usually large (Please refer to Sangmo Kang et al., Chemical Engineering Journal, 2020, 379, 122315), the nanometal cannot be protected, causing the loss of the nanometal and the rapid inactivation of the catalytic membrane.

Summarizing the above-mentioned methods, it is not difficult to find that in the current research, the preparation of the nanoparticle incorporated support catalyst tends to experience multiple steps, and each step may change the structure and properties of the catalyst, affecting the catalytic activity and stability, and consuming time and energy. Therefore, it is necessary to develop a new preparation method for the catalytic membrane, so as to reduce the preparation steps of the catalytic membrane. On the premise of maintaining the excellent properties of the polymer fiber, the nanometal is coated in the polymer fiber, and the fiber has a porous structure, so that the prepared catalytic membrane has high reaction mass transfer efficiency and excellent stability.

SUMMARY

In order to solve the problems existing in the prior art, the disclosure provides a preparation method, a product and an application of a gradient long-effective catalytic membrane with high-strength and anti-deposition property. A precursor membrane of the catalytic membrane with a porous structure is obtained by a low-temperature one-step synthesis method, and then the catalytic membrane is obtained by performing freeze-drying on the precursor membrane of the catalytic membrane, thus solving the problems of complicated steps, difficulty in adjusting the structure and low mechanical strength in preparing a nanofiber membrane catalyst in the prior art, and improving disadvantages of the catalytic membrane in the degradation process of organic pollutants, such as low reaction efficiency, unstable structure, short serve life, and difficult to recycle.

In order to achieve the above purpose, the disclosure provides technical schemes as follows.

The first technical scheme of the disclosure is a preparation method of a gradient long-effective catalytic membrane with high-strength and anti-deposition property, which includes the follow steps:

adding a nanometal oxide catalyst into an N,N-dimethylformamide solution of one of polyacrylonitrile and polystyrene (also referred to as one of polyacrylonitrile solution and polystyrene solution) and then uniformly mixing to obtain a mixture solution; performing electrostatic spinning on the mixture solution to obtain a precursor membrane of the catalytic membrane, where a receiver is at a temperature in a range of −190° C. to −200° C. during the electrostatic spinning; and performing freeze-drying on the precursor membrane of the catalytic membrane obtained after the electrostatic spinning is finished to obtain the gradient long-effective catalytic membrane with high-strength and anti-deposition property.

In an embodiment, a preparation method of the nanometal oxide catalyst includes the following steps:

depositing one of iron acetylacetonate, copper acetylacetonate, chromium acetylacetonate and acetylacetonate in a protective atmosphere to obtain a nanometal catalyst precursor; and roasting the nanometal catalyst precursor in air to obtain the nanometal oxide catalyst.

In an embodiment, the protective atmosphere is nitrogen or argon; and conditions of the depositing are as follows: a deposition temperature is in a range of 200° C. to 300° C., a heating rate is in a range of 5° C./min to 8° C./min, and a deposition time is in a range of 60 min to 90 min.

In an embodiment, conditions of the roasting are as follows: a roasting temperature is in a range of 450° C. to 600° C., a heating rate is in a range of 1° C./min to 3° C./min, and a roasting time is in a range of 4 h to 8 h.

In an embodiment, a mass ratio of the nanometal oxide catalyst to the one of polyacrylonitrile and polystyrene is 1~3 : 2.5-5.

In an embodiment, conditions of the electrostatic spinning are as follows: a voltage is in a range of +10 kV to +17 kV and another voltage is in a range of −2 kV to −4 kV, a distance between the receiver and the needle is in a range of 5 cm to 7 cm, and a time of the electrostatic spinning is in a range of 30 min to 60 min; the receiver is placed in a low-temperature control device, and the low-temperature control device is configured to control temperature by adjusting the volume of liquid nitrogen.

In an embodiment, the freeze-drying specifically includes the following steps: vacuumizing at a temperature in a range of 10° C. to 35° C. until a vacuum degree is in a range of 10 Pa to 30 Pa, keeping the temperature and the vacuum degree unchanged, drying for a time in a range of 4 h to 8 h, and then taking out.

The second technical scheme of the disclosure is the gradient long-effective catalytic membrane with high-strength and anti-deposition property prepared by the above preparation method.

The third technical scheme of the disclosure is the application of the gradient long-effective catalytic membrane with high-strength and anti-deposition property in the conversion of organic pollutants.

The technical concept of the disclosure is as follows.

According to the disclosure, the electrostatic spinning technology is combined with the ultra-low temperature induced phase separation principle to design and obtain a novel gradient long-effective catalytic membrane with high-strength and anti-deposition property, and the pore structure gradient of the membrane is regulated and controlled by controlling the spinning conditions, the volume of the freezing liquid, the volatilization rate (the volatilization rate is controlled by controlling the ambient temperature) and other conditions, so that the one-step preparation of the catalytic membrane with high mass transfer efficiency and high stability is realized, the excellent performance of the polymer membrane is maintained to the greatest extent, and the contact efficiency of the nanometal oxide in the reaction is improved. Thermally induced phase separation (TIPS) uses the distribution and solubility of solute in solution at different temperatures for solid-liquid phase separation, which has simple process and high reproducibility. During the phase separation of polymer solution, applying high cooling rate will increase the driving force of phase separation, which will change the mechanism of phase separation from nucleation growth to spinodal decomposition, resulting in the formation of polymer-rich and polymer-poor phases in the solution. After the polymer-rich phase coarsens, grows and solidifies, a branched bicontinuous porous structure will be formed, and the porosity of the membrane will increase with the increase of cooling rate, and the pore size will decrease with the decrease of temperature. In the catalytic membrane prepared by the method of the disclosure, the nanometal is coated in the polymer fiber with high strength and stability, which can play a protective role in the subsequent catalytic reaction process, reduce the passivation phenomenon of the nanometal surface and the loss in the use process, and improve the stability and reusability of the catalytic membrane. At the same time, the porous structure of the fiber ensures the full contact between nanometal and reactants and effectively reduces the internal diffusion resistance. A three-dimensional structure with high porosity formed by cross-linking and coupling between fibers can effectively reduce the external diffusion resistance in the reaction process, and the combination of multi-scale effects can realize the efficient utilization of the catalytic membrane in the degradation of organic pollutants, reduce the deposition of pollutants on the catalytic membrane through efficient degradation and prolong the service life of the catalytic membrane.

The disclosure discloses the following technical effects.

(1) The disclosure omits the calcination step, simplifies the preparation process, reduces the preparation cost, and at the same time, the disclosure can retain the physicosure base material, so that the gradient structure of the organic polymer base material is easy to accurately regulate and control, and the mechanical strength is improved, thereby effectively improving the service performance of the fiber composite membrane, greatly reducing the leaching of active components, improving the reusable rate of the catalytic membrane and effectively reducing the treatment cost of organic wastewater.

(2) The preparation method of the disclosure adopts ultra-low temperature-electrostatic spinning technology, combines with nanometal, and obtains a novel gradient long-effective catalytic membrane with high-strength and anti-deposition property with excellent performance, controllable structure, high specific area and high porosity through one-step method, thus solving the problems of complicated steps, difficult regulation of structure and low mechanical strength in the previous preparation of nanometal composite catalytic membrane, simplifying the preparation process, avoiding the influence of the preparation process on the activity of the catalytic membrane, and maintaining the activity, stability and mechanical strength of the catalytic membrane to the greatest extent. At the same time, the synergistic effect of nanometal and organic polymer carrier is effectively exerted, which solves the problems of easy oxidation of catalyst surface and easy agglomeration of particles, and gives full play to its catalytic performance.

(3) The method of the disclosure improves the bonding strength between the catalyst and the carrier, greatly reduces the leaching of the carrier, and prevents the nano-particles in the fiber membrane from dissolving out, which also makes the prepared catalytic membrane have higher reusability compared with the traditional composite catalyst. Moreover, due to the adjustability of various parameters of electrostatic spinning, the gradient structure of the membrane can be accurately controlled according to requirements, and at the same time, the multi-scale effect of the catalytic membrane is used to strengthen the reaction mass transfer process, shorten the reactant transfer distance, optimize the mass transfer path, reduce the reactant migration resistance and improve the contact.

(4) The method of the disclosure solves the problem that particles (such as free radicals, etc.) with strong oxidation generated during the catalytic reaction damage the structure of the polymer and reduce the activity and stability of the membrane. In the process of catalytic reaction, reactants enter the fiber through the porous structure to contact with nanometal and react. Through the "confinement effect", the local concentration of reactants increases and the reactants fully contact with nanometal, which significantly improves the efficiency and selectivity of catalytic reaction, fully degrades pollutants and reduces the deposition of pollutants on the catalytic membrane. At the same time, because the reaction is mostly confined to the porous structure of the fiber, the oxidized particles generated in the reaction process are fully consumed, and it is difficult to spread out of the pore, which reduces the contact between the oxidized particles and the outer polymer fiber and prolongs the service life of the catalytic membrane.

(5) The product prepared by the disclosure has excellent catalytic efficiency and good stability synchronously; and the product can effectively exert the synergistic effect of nanometal oxide and organic polymer material carrier, solve the contradictory relationship between catalytic efficiency and membrane stability in traditional catalytic membranes, give full play to its catalytic performance, effectively catalyze and degrade organic polluted wastewater, and prolong the service life.

BRIEF DESCRIPTION OF DRAWINGS

In order to more clearly explain the embodiments of the disclosure or the technical solutions in the prior art, the following will briefly introduce the drawings needed in the embodiments. It is obvious that the drawings in the following description are only some of the embodiments of the disclosure. For those skilled in the art, other drawings can also be obtained from these drawings without creative work.

DETAILED DESCRIPTION OF EMBODIMENTS

A variety of exemplary embodiments of the disclosure are described in detail. The detailed description should not be considered as a limitation of the disclosure, but should be understood as a more detailed description of some aspects, features and implementation of the disclosure.

It should be understood that the terms described in the disclosure are only for describing special embodiments and are not intended to limit the disclosure. In addition, for the numerical range in the disclosure, it should be understood that each intermediate value between the upper and lower limits of the range is also specifically disclosed. Any stated value, the intermediate value within the stated range, and every smaller range within the stated range are also included in the disclosure. The upper and lower limits of the smaller range can be included or excluded independently.

Unless otherwise stated, all technical and scientific terms used herein have the same meaning as those commonly understood by those skilled in the art described in the disclosure. Although the disclosure only describes preferred methods and materials, any methods and materials similar or equivalent to those described herein can also be used in the implementation or test of the disclosure. All documents mentioned in this specification are incorporated by reference to disclose and describe methods and/or materials related to the said documents. In case of conflict with any incorporated literature, the contents of this manual shall prevail.

Without departing from the scope or spirit of the disclosure, it is obvious to those skilled in the art that various improvements and changes can be made to the specific implementation of the specification of the disclosure. Other embodiments obtained from the specification of the disclosure will be apparent to those skilled in the art. The description and embodiment of the disclosure are only illustrative.

The terms "including", "having", "containing" and so on used in this article are open terms, which means including but not limited to.

The raw materials used in the embodiments of the disclosure can be commercially available without special instructions.

Embodiment 1

Step 1, the preparation of a nanometal oxide catalyst: the copper acetylacetone is placed in a crucible and the nitrogen is added into the crucible for depositing under conditions of a deposit temperature being 200° C., a heating rate being 5° C./min, and a deposition time being 60 min, and then the nanometal catalyst precursor is prepared. The nanometal oxide catalyst is roasted in air at 450° C. with an initial temperature being 25° C., a heating rate being 1° C./min, and a roasting time being 4 h, to obtain the nanometal oxide catalyst.

Step 2, the preparation of a 100 g/L polyacrylonitrile solution: 5 g of polyacrylonitrile solid is weighed and dissolved in 50 mL of N,N-dimethylformamide to obtain a mixture, magnets are added into the mixture and then the mixture is stirred on a magnetic stirrer for 15 min, thereby to obtain the 100 g/L polyacrylonitrile solution.

Step 3: the preparation of a gradient long-effective catalytic membrane with high-strength and anti-deposition property (referred to as catalytic membrane) includes: the following step 3.1 to step 3.3.

Step 3.1: 2 g of the nanometal oxide catalyst is weighted and dissolved in 50 mL of the 100 g/L polyacrylonitrile solution prepared in step 2 with stirring for 2 h on a magnetic stirrer to obtain a mixed solution.

Step 3.2: a syringe is used to extract 4 mL of the above mixed solution, a distance between the needle of the syringe and the receiver is adjusted to 5 cm, and voltages of the electrostatic spinning machine are +10 kV and −2 kV. The liquid nitrogen is poured into the receiver to control the low temperature. The volume of the liquid nitrogen is controlled to be 100 mL, and the ambient temperature is 25° C. After the receiver is stable, the spinning is started for 30 min to obtain a precursor membrane of the catalytic membrane.

Step 3.3: the obtained precursor membrane of the catalytic membrane is quickly put into a freeze dryer. The low-temperature drying procedure of the freeze dryer is to vacuum at 10° C. to a vacuum degree of 30 Pa, then keep the temperature and vacuum degree unchanged, and take it out after drying for 4 h to obtain the catalytic membrane.

The performance of the catalytic membrane prepared in this embodiment is tested.

Figure 1:
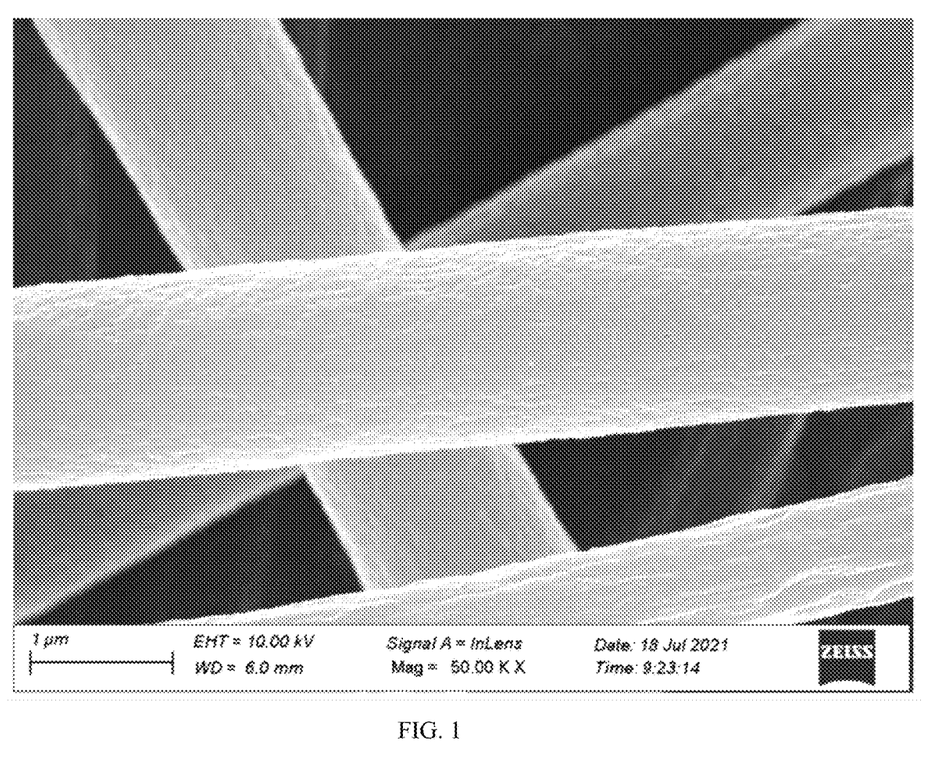
FIG. 1 illustrates a scanning electron microscope (SEM) diagram of a gradient long-effective catalytic membrane with high-strength and anti-deposition property prepared in an embodiment 1.
Figure 2:
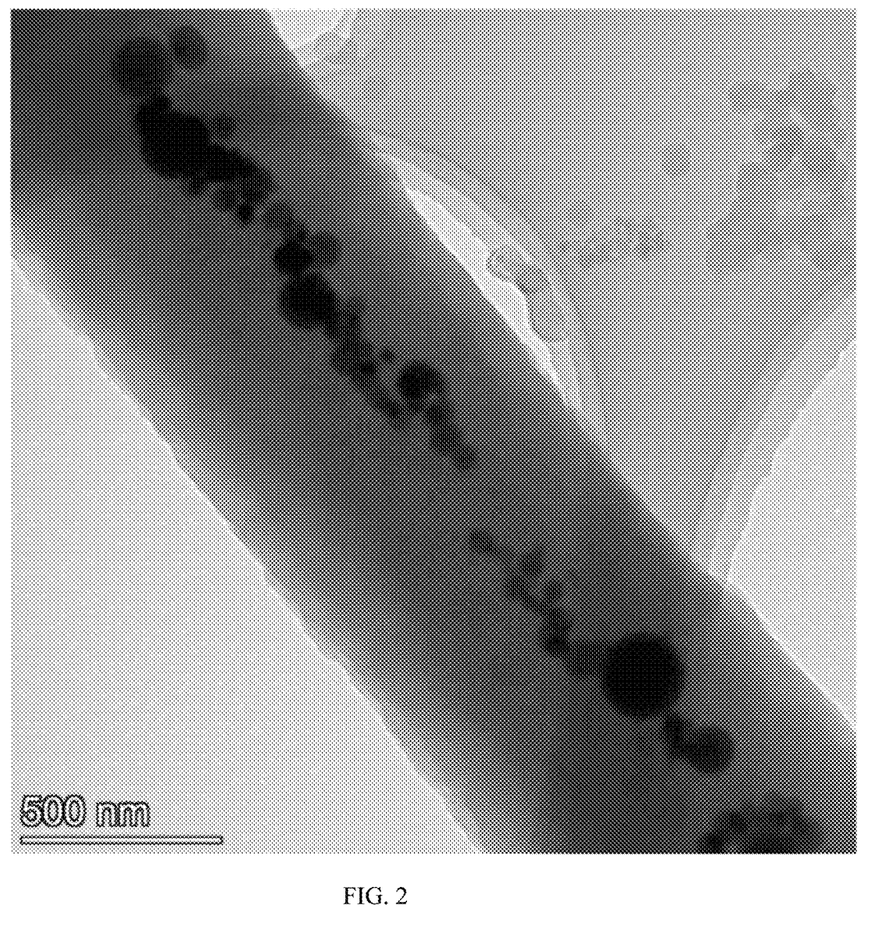
FIG. 2 illustrates a transmission electron microscope (TEM) diagram of the gradient long-effective catalytic membrane with high-strength and anti-deposition property prepared in the embodiment 1.
Figure 3:
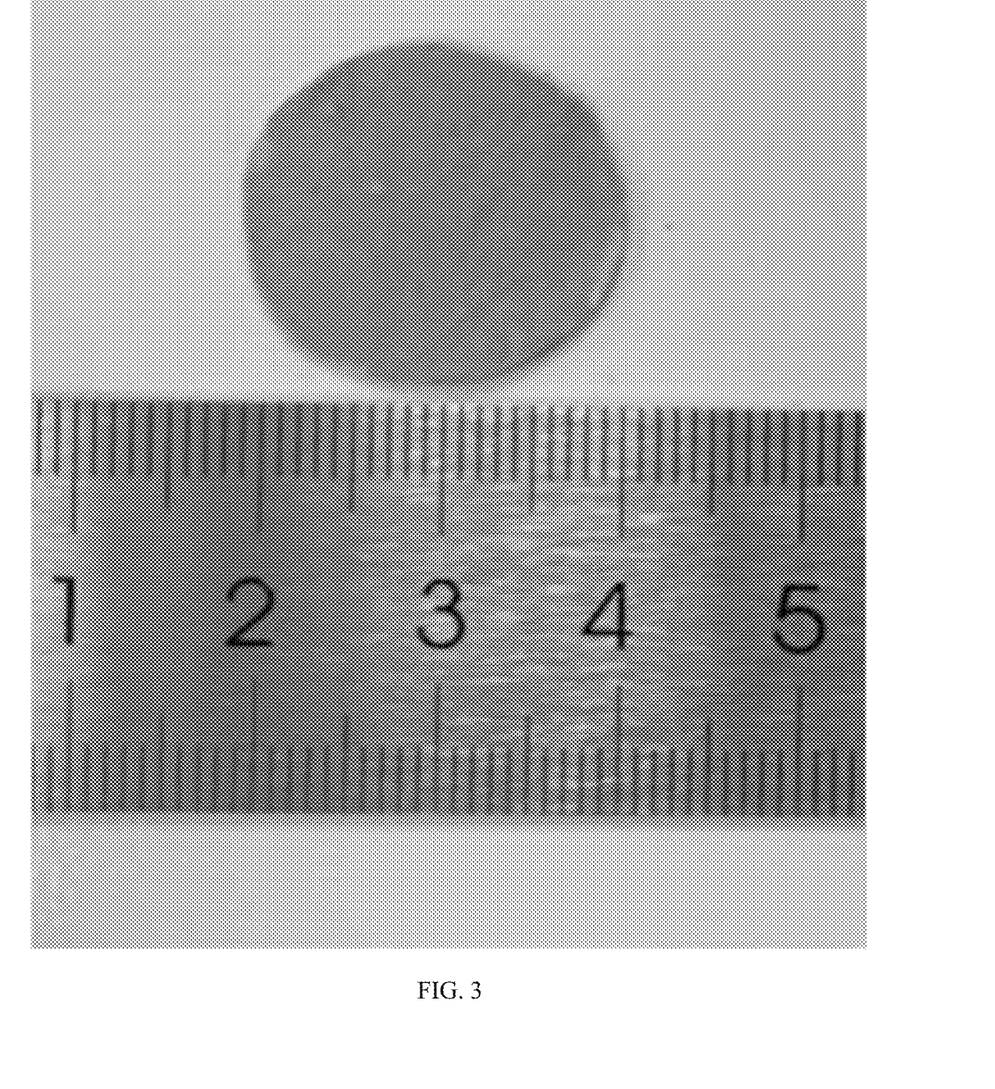
FIG. 3 illustrates a practicality picture of the gradient long-effective catalytic membrane with high-strength and anti-deposition property prepared in the embodiment 1.
Figure 4:
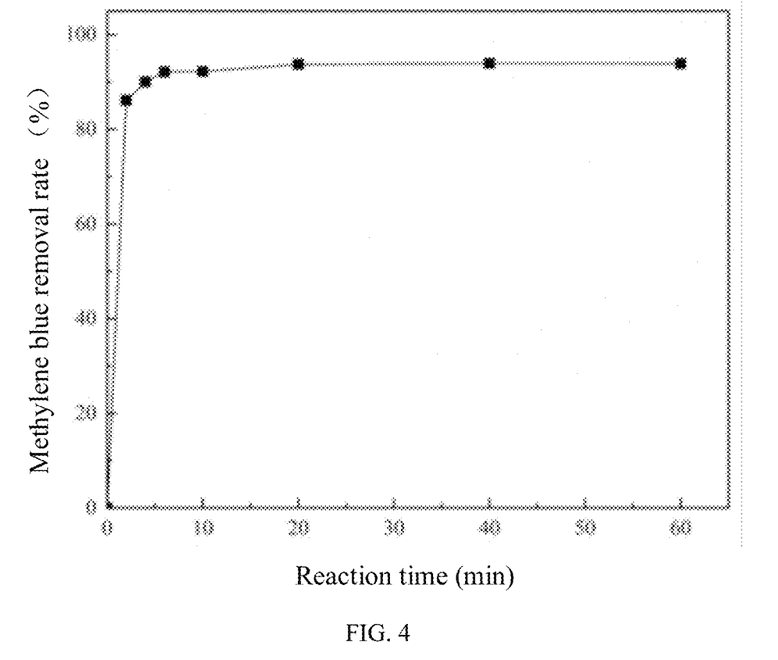
FIG. 4 illustrates a schematic diagram showing the change of the removal rate of methylene blue in the catalytic degradation of the gradient long-effective catalytic membrane with high-strength and anti-deposition property prepared in the embodiment 1 with the reaction time.

A shaking bed reactor is taken as a reaction device and the catalytic membrane prepared in this embodiment is taken as the catalyst, the experiment of catalytic oxidation degradation of organic substances in wastewater is carried out. The reaction conditions are as follows: 50 mL of 20 mg/L methylene blue is put into a 250 mL blue bottle, the 50 mL of 4 mmol/L (abbreviated as mM) hydrogen peroxide is added into the blue bottle, 30 mg of the catalytic membrane is added into the blue bottle, pH is adjusted to be 3 with dilute nitric acid or dilute sodium hydroxide solution, the blue bottle is put into a thermostatic shaker with rotating at 200 revolutions per minute (abbreviated as rpm), samples are taken every 3 min, the reaction is performed for 20 min, and the degradation effect is detected by ultraviolet spectrophotometry (wavelength 664 nm). The results are as shown in FIG. 4, the absorbance decreases by 92% at 10 minutes of the reaction, and decreases by 94% after 20 minutes of the reaction, which tends to be stable. It shows that the degradation effect of the catalytic membrane prepared in this embodiment on the methylene blue is 92% in 10 minutes and 94% in 20 minutes. The used catalytic membrane is recycled to repeat the above catalytic degradation experiment of methylene blue. After the catalytic membrane is recycled for 5 times, the degradation rate is 89% after 20 minutes of the reaction. The porosity and mechanical properties of the prepared catalytic membrane are tested, the results show that the catalytic membrane has high porosity, large specific surface area, small pore size, uniform distribution of pores in the material, strong water permeability, high mechanical strength, good durability and tensile properties. It shows that the catalytic membrane prepared in this embodiment has good structural stability and anti-deposition effect.

Embodiment 2

Step 1, the preparation of a nanometal oxide catalyst: the iron acetylacetonate is placed in a crucible and the nitrogen is added into the crucible for depositing under conditions of a deposit temperature being 250° C., a heating rate being 6° C./min, and a deposition time being 80 min, and then the nanometal catalyst precursor is prepared. The nanometal oxide catalyst is roasted in air at 500° C. with an initial temperature being 25° C., a heating rate being 2° C./min, and a roasting time being 6 h, to obtain the nanometal oxide catalyst.

Step 2, the preparation of a 150 g/L polyacrylonitrile solution: 7.5 g of polyacrylonitrile solid is weighed and dissolved in 50 mL of N,N-dimethylformamide to obtain a mixture, magnets are added into the mixture and then the mixture is stirred on a magnetic stirrer for 15 min, thereby to obtain the 150 g/L polyacrylonitrile solution.

Step 3: the preparation of a gradient long-effective catalytic membrane with high-strength and anti-deposition property (referred to as catalytic membrane) includes the following step 3.1 to step 3.3.

Step 3.1: 4 g of the nanometal oxide catalyst is weighted and dissolved in 50 mL of the 150 g/L polyacrylonitrile solution prepared in step 2 with stirring for 2 h on a magnetic stirrer to obtain a mixed solution.

Step 3.2: a syringe is used to extract 4 mL of the above mixed solution, a distance between the needle of the syringe and the receiver is adjusted to 6 cm, and voltages of the electrostatic spinning machine are +12 kV and −3 kV. The liquid nitrogen is poured into the receiver to control the low temperature. The volume of the liquid nitrogen is controlled to be 125 mL, and the ambient temperature is 25° C. After the receiver is stable, the spinning is started for 45 min to obtain a precursor membrane of the catalytic membrane.

Step 3.3: the obtained precursor membrane of the catalytic membrane is quickly put into a freeze dryer. The low-temperature drying procedure is to vacuum at 24° C. to a vacuum degree of 20 Pa, then keep the temperature and vacuum degree unchanged, and take it out after drying for 6 h to obtain the catalytic membrane.

The performance of the catalytic membrane prepared in this embodiment is tested.

A shaking bed reactor is taken as a reaction device and the catalytic membrane prepared in this embodiment is taken as the catalyst, the experiment of catalytic oxidation degradation of organic substances in wastewater is carried out. The reaction conditions are as follows: 50 mL of 20 mg/L methylene blue is put into a 250 mL blue bottle, 50mL of 4 mM hydrogen peroxide is added into the blue bottle, 30 mg of the catalytic membrane is added into the blue bottle, pH is adjusted to be 3 with dilute nitric acid or dilute sodium hydroxide solution, the blue bottle is put into a thermostatic shaker with rotating at 200 rpm, samples are taken every 3 min, the reaction is performed for 20 min, and the degradation effect is detected by ultraviolet spectrophotometry (wavelength 664 nm). The results show that the absorbance decreases by 94% at 10 minutes of the reaction, and decreases by 96% after 20 minutes of the reaction. It shows that the degradation effect of the catalytic membrane prepared in this embodiment on the methylene blue is 94% in 10 minutes and 96% in 20 minutes. The used catalytic membrane is recycled to repeat the above catalytic degradation experiment of methylene blue. After the catalytic membrane is recycled for 5 times, the degradation rate is 92% after 20 minutes of the reaction. It shows that the catalytic membrane prepared in this embodiment has good structural stability and anti-deposition effect.

Embodiment 3

Step 1, the preparation of a nanometal oxide catalyst: the chromium acetylacetonate is placed in a crucible and the nitrogen is added into the crucible for depositing under conditions of a deposit temperature being 300° C., a heating rate being 8° C./min, and a deposition time being 90 min, and then the nanometal catalyst precursor is prepared. The nanometal oxide catalyst is roasted in air at 600° C. with an initial temperature being 25° C., a heating rate being 3° C./min, and a roasting time being 8 h, to obtain the nanometal oxide catalyst.

Step 2, the preparation of a 200 g/L polyacrylonitrile solution: 10 g of polyacrylonitrile solid is weighed and dissolved in 50 mL of N,N-dimethylformamide to obtain a mixture, magnets are added into the mixture and then the mixture is stirred on a magnetic stirrer for 15 min, thereby to obtain the 200 g/L polyacrylonitrile solution.

Step 3: the preparation of a gradient long-effective catalytic membrane with high-strength and anti-deposition property (referred to as catalytic membrane) includes the following step 3.1 to step 3.3.

Step 3.1: 6 g of the nanometal oxide catalyst is weighted and dissolved in 50 mL of the 200 g/L polyacrylonitrile solution prepared in step 2 with stirring for 2 h on a magnetic stirrer to obtain a mixed solution.

Step 3.2: a syringe is used to extract 4 mL of the above mixed solution, a distance between the needle of the syringe and the receiver is adjusted to 7 cm, and voltages of the electrostatic spinning machine are +17 kV and −4 kV. The liquid nitrogen is poured into the receiver to control the low temperature. The volume of the liquid nitrogen is controlled to be 150 mL, and the ambient temperature is 25° C. After the receiver is stable, the spinning is started for 60 min to obtain a precursor membrane of the catalytic membrane.

Step 3.3: the obtained precursor membrane of the catalytic membrane is quickly put into a freeze dryer. The low-temperature drying procedure is to vacuum at 35° C. to a vacuum degree of 10 Pa, then keep the temperature and vacuum degree unchanged, and take it out after drying for 8 h to obtain the catalytic membrane.

The performance of the catalytic membrane prepared in this embodiment is tested.

A shaking bed reactor is taken as a reaction device and the catalytic membrane prepared in this embodiment is taken as the catalyst, the experiment of catalytic oxidation degradation of organic substances in wastewater is carried out. The reaction conditions are as follows: 50 mL of 20 mg/L methylene blue is put into a 250 mL blue bottle, 50 mL of 4 mM hydrogen peroxide is added into the blue bottle, 30 mg of the catalytic membrane is added into the blue bottle, pH is adjusted to be 3 with dilute nitric acid or dilute sodium hydroxide solution, the blue bottle is put into a thermostatic shaker with rotating at 200 rpm, samples are taken every 3 min, the reaction is performed for 20 min, and the degradation effect is detected by ultraviolet spectrophotometry (wavelength 664 nm). The results show that the absorbance decreases by 96% at 10 minutes of the reaction, and decreases by 99% after 20 minutes of the reaction. It shows that the degradation effect of the catalytic membrane prepared in this embodiment on the methylene blue is 96% in 10 minutes and 99% in 20 minutes. The used catalytic membrane is recycled to repeat the above catalytic degradation experiment of methylene blue. After the catalytic membrane is recycled for 5 times, the degradation rate is 95% after 20 minutes of the reaction. It shows that the catalytic membrane prepared in this embodiment has good structural stability and anti-deposition effect.

Comparative Example 1

The steps are roughly the same as those in the embodiment 1, except that the conditions of the electrostatic spinning in step 3.2 are that the voltages of the electrostatic spinning are +5 kV and −1 kV.

Results: the catalytic membrane prepared by the comparative example 1 has loose structure, low mechanical strength and poor durability.

The performance of the catalytic membrane prepared in the comparative example 1 is tested in the same way as that in the embodiment 1. The results show that the degradation rate of the catalytic membrane prepared in the comparative example 1 is 65% in the reaction of catalytic oxidation degradation of methylene blue for 10 minutes. The degradation rate is 80% after 20 minutes of the reaction. The used catalytic membrane is recycled to repeat the above catalytic degradation experiment of methylene blue. After the catalytic membrane is recycled for 5 times, the degradation rate is 70% after 20 minutes of the reaction.

Comparative Example 2

The steps are roughly the same as those in the embodiment 1, except that the step of pouring liquid nitrogen into the receiver to control the low temperature in step 3.2 is omitted.

Results: the catalytic membrane prepared by the comparative example 2 has poor water permeability and low porosity.

The performance of the catalytic membrane prepared in the comparative example 2 is tested in the same way as that in the embodiment 1. The results show that the degradation rate of the catalytic membrane prepared in the comparative example 2 in the reaction of catalytic oxidation degradation of methylene blue is 78% at 10 min and 82% after 20 min. The used catalytic membrane is recycled to repeat the above catalytic degradation experiment of methylene blue. After the catalytic membrane is recycled for 5 times, the degradation rate is 75% after 20 minutes of the reaction.

Comparative Example 3

The steps are roughly the same as those in the embodiment 1, except that the freeze-drying in step 3 is omitted.

Results: the catalytic membrane prepared by the comparative example 3 has poor mechanical strength and low porosity.

The performance of the catalytic membrane prepared in the comparative example 3 is tested in the same way as that in the embodiment 1. The results show that the degradation rate of the catalytic membrane prepared in the comparative example 3 in the reaction of catalytic oxidation degradation of methylene blue is 75% at 10 min and 80% after 20 min. The used catalytic membrane is recycled to repeat the above catalytic degradation experiment of methylene blue. After the catalytic membrane is recycled for 5 times, the degradation rate is 59% after 20 minutes of the reaction.

The above described embodiments only describe the preferred method of the disclosure, not limit the scope of the disclosure. Without departing from the design spirit of the disclosure, all the variations and improvements made by those skilled in the art to the technical solution of the disclosure should fall within the scope of protection determined in the claims of the disclosure.

What is claimed is:

1. An application method of a gradient long-effective catalytic membrane with high-strength and anti-deposition property in conversion of organic pollutants, comprising the following steps:
    adding a nanometal oxide catalyst into an N,N-dimethylformamide solution of one of polyacrylonitrile and polystyrene and then uniform mixing to obtain a mixture solution;
    performing electrostatic spinning on the mixture solution to obtain a precursor membrane of the catalytic membrane; wherein a receiver is at a temperature in a range of −190° C. to −200° C. during the electrostatic spinning; and
    performing freeze-drying on the precursor membrane of the catalytic membrane obtained after the electrostatic spinning is finished to obtain the gradient long-effective catalytic membrane with high-strength and anti-deposition property;
    wherein a preparation method of the nanometal oxide catalyst comprises the following steps:
    depositing one of iron acetylacetonate, copper acetylacetonate and chromium acetylacetonate in a protective atmosphere to obtain a nanometal catalyst precursor; and
    roasting the nanometal catalyst precursor in air to obtain the nanometal oxide catalyst;
    wherein a mass ratio of the nanometal oxide catalyst to the one of polyacrylonitrile and polystyrene is 1~3 : 2.5~5;
    wherein conditions of the electrostatic spinning are as follows: a voltage is in a range of +10 kV to +17 kV and another voltage is in a range of −2 kV to −4 kV, a distance between the receiver and a needle is in a range of 5 cm to 7 cm, and a time of the electrostatic spinning is in a range of 30 min to 60 min; and the receiver is placed in a low-temperature control device, and the low-temperature control device is configured to control temperature by adjusting a volume of liquid nitrogen.

2. The application method of the gradient long-effective catalytic membrane with high-strength and anti-deposition property in the conversion of organic pollutants according to claim 1, wherein the protective atmosphere is one of nitrogen and argon, and conditions of the depositing are as follows: a deposition temperature is in a range of 200° C. to 300° C., a heating rate is in a range of 5° C./min to 8° C./min, and a deposition time is in a range of 60 min to 90 min.

3. The application method of the gradient long-effective catalytic membrane with high-strength and anti-deposition property in the conversion of organic pollutants according to claim 1, wherein conditions of the roasting are as follows: a roasting temperature is in a range of 450° C. to 600° C., a heating rate is in a range of 1° C./min to 3° C./min, and a roasting time is in a range of 4 h to 8 h.

4. The application method of the gradient long-effective catalytic membrane with high-strength and anti-deposition property in the conversion of organic pollutants according to claim 1, wherein the freeze-drying specifically comprises: vacuumizing at a temperature in a range of 10° C. to 35° C. until a vacuum degree is in a range of 10 Pa to 30 Pa, keeping the temperature and the vacuum degree unchanged, drying for a time in a range of 4 h to 8 h, and then taking out.

* * * * *